(12) United States Patent
Gomi et al.

(10) Patent No.: US 7,468,846 B2
(45) Date of Patent: Dec. 23, 2008

(54) IMAGING APPARATUS INCLUDING MULTIPLE OPTICAL SYSTEMS

(75) Inventors: Kazunori Gomi, Nagano (JP); Nobuo Komatsu, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 109 days.

(21) Appl. No.: 11/621,599

(22) Filed: Jan. 10, 2007

(65) Prior Publication Data

US 2008/0018779 A1    Jan. 24, 2008

(30) Foreign Application Priority Data

Jul. 24, 2006    (JP)    ............................. 2006-200763

(51) Int. Cl.
G02B 15/14    (2006.01)
(52) U.S. Cl. .................................... 359/696; 359/823
(58) Field of Classification Search ................. 359/372, 359/373, 403, 419, 696, 823, 829
See application file for complete search history.

(56) References Cited

U.S. PATENT DOCUMENTS 6,839,082 B2 *    1/2005    Lee et al. ...................... 348/81

FOREIGN PATENT DOCUMENTS

JP    5-249362    9/1993
JP    2000-47089    2/2000

* cited by examiner

*Primary Examiner*—Joseph Martinez
(74) *Attorney, Agent, or Firm*—Thomas J. Strouse

(57) ABSTRACT

The number of drive motors in a digital camera having multiple imaging optical systems is curtailed. The digital camera has a first imaging optical system and a second imaging optical system. The first imaging optical system has a zoom lens group and a focus lens. The second imaging optical system has another zoom lens group and another focus lens. The focus lens groups are actuated commonly by a focusing drive motor. The former focus lens group is moved by a gear G3 and an outer peripheral gear of a lens guide ring. The latter focus lens group is moved by a feed screw.

3 Claims, 2 Drawing Sheets

IMAGING APPARATUS INCLUDING MULTIPLE OPTICAL SYSTEMS

CROSS REFERENCE TO RELATED APPLICATIONS

This application claims priority to Japanese Patent Application No. 2006-200763 filed on Jul. 24, 2006, which is incorporated herein by reference in its entirety.

FIELD OF THE INVENTION

The present invention relates to an imaging apparatus having multiple optical systems, and more particularly, to a zooming or focusing drive mechanism.

BACKGROUND OF THE INVENTION

In an imaging apparatus such as a digital camera, zooming of a lens is performed by a drive mechanism and a drive motor, and focusing of the same is performed by another drive mechanism and another drive motor. Such a structure hinders miniaturization and cost reduction of, particularly, a compact digital camera.

Japanese Patent Laid-Open Publication No. Hei 5-249362 describes a structure of actuating a front group of lenses and a rear group of lenses independently of each other by means of rotation of a drive ring, to thus enable a single drive motor to perform zooming and focusing operations. Moreover, Japanese Patent Laid-Open Publication No. 2000-47089 discloses that a single drive motor performs zooming operation and autofocusing (AF) operation; that a sun gear, a planetary gear, and a ring gear are provided; that, when the ring gear has rotated, torque of a drive motor is transmitted to focus movement means; and that, when rotation of the ring gear is hindered, the torque is transmitted to zoom movement means.

A digital camera having a plurality of imaging optical systems rather than a single imaging optical system is assumed. A wide imaging range can be covered without replacement of a lens, by means of providing the respective imaging optical systems with different focal lengths. However, there arises a problem of the internal structure of the multiple imaging optical systems becoming more complicated than that of a single imaging optical system. For instance, on the assumption of a digital camera having a first imaging optical system and a second imaging optical system, a total of four drive motors; namely, a motor for actuating a zoom lens of a first imaging optical system, a motor for actuating a focus lens, a motor for actuating a zoom lens of a second imaging optical system, and a motor for actuating a focus lens, are required, which in turn leads to an increase in the size and cost of the digital camera. As described in the related art, another conceivable way is to actuate the zoom lens and the focus lens of the first imaging optical system by means of a single drive motor and to actuate the zoom lens and the focus lens of the second imaging optical system by means of another single drive motor. However, synchronous actuation of the first imaging optical system and the second imaging optical system is desirable. Moreover, it is desirable to be able to actuate the zoom lens of the first imaging optical system and the zoom lens of the second imaging optical system by means of a single drive motor or to actuate the focus lens of the first imaging optical system and the focus lens of the second imaging optical system by means of a single drive motor.

SUMMARY OF THE INVENTION

Accordingly, the present invention provides an imaging apparatus having a plurality of optical systems, wherein a drive motor is shared between focus lenses of respective imaging optical systems, to thus achieve a simple configuration and low cost.

The present invention provides an imaging apparatus including multiple optical systems, comprising a first imaging optical system; and a second imaging optical system having an aperture of angle which differs from that of the first imaging optical system, wherein:

the first imaging optical system has a first focusing lens;

the second imaging optical system has a second focusing lens;

the first focusing lens and the second focusing lens are driven by a common focusing drive motor;

the first focusing lens meshes with an inner peripheral thread formed on a lens ring guide rotationally driven by the focusing drive motor; and the second focusing lens is connected to a feed screw coupled to the focusing drive motor.

In the present invention, a gear is preferably formed on an outer periphery of the lens guide ring, and preferably meshes with the focusing drive motor.

According to the present invention, the focusing lens of the first imaging optical system and the focusing lens of the second imaging optical system are arranged so as to be driven by a single drive motor. Accordingly, a simple structure can be achieved. Moreover, the focusing lens of the first imaging optical system is actuated by way of a lens guide ring, thereby facilitating adjustment of the amount of movement of the focusing lens of the first imaging optical system; namely, adjustment of resolving power.

The invention will be more clearly comprehended by reference to the embodiment provided below. However, the scope of the invention is not limited to that embodiment.

BRIEF DESCRIPTION OF THE DRAWINGS

A preferred embodiment of the present invention will be described in detail based on the following figures, wherein.

DETAILED DESCRIPTION OF THE PREFERRED EMBODIMENT

An embodiment of the present invention will be described hereinbelow by reference to the drawings. A digital camera of the present embodiment comprises two imaging optical systems; namely, a first imaging optical system (a WIDE-end optical system) having a relatively-wide angle of view, and a second imaging optical system (a telephoto-side optical system) having a relatively-narrow angle of view.

Figure 1:
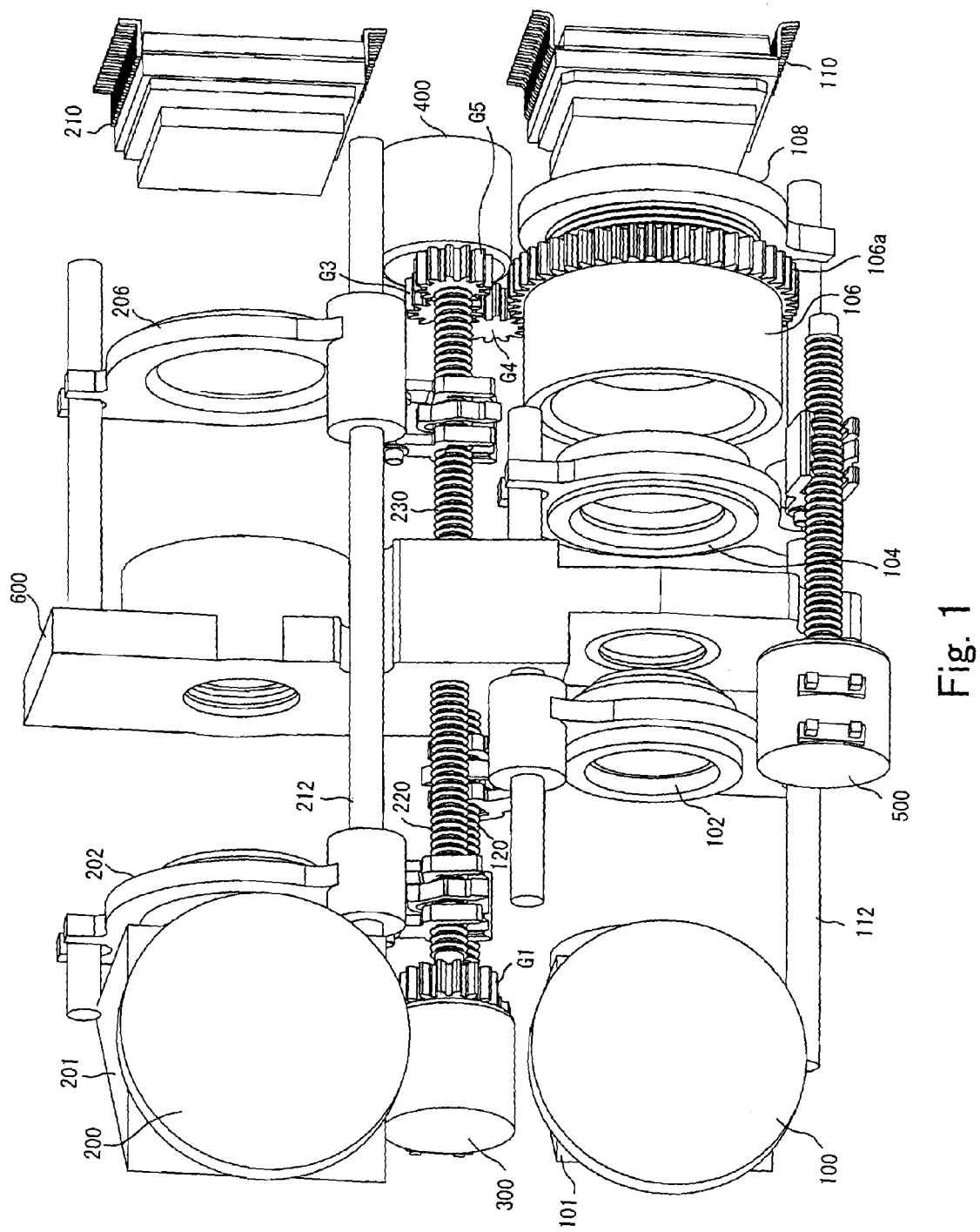
FIG. 1 is a (front) view showing the internal structure of a digital camera of an embodiment of the present invention.
Figure 2:
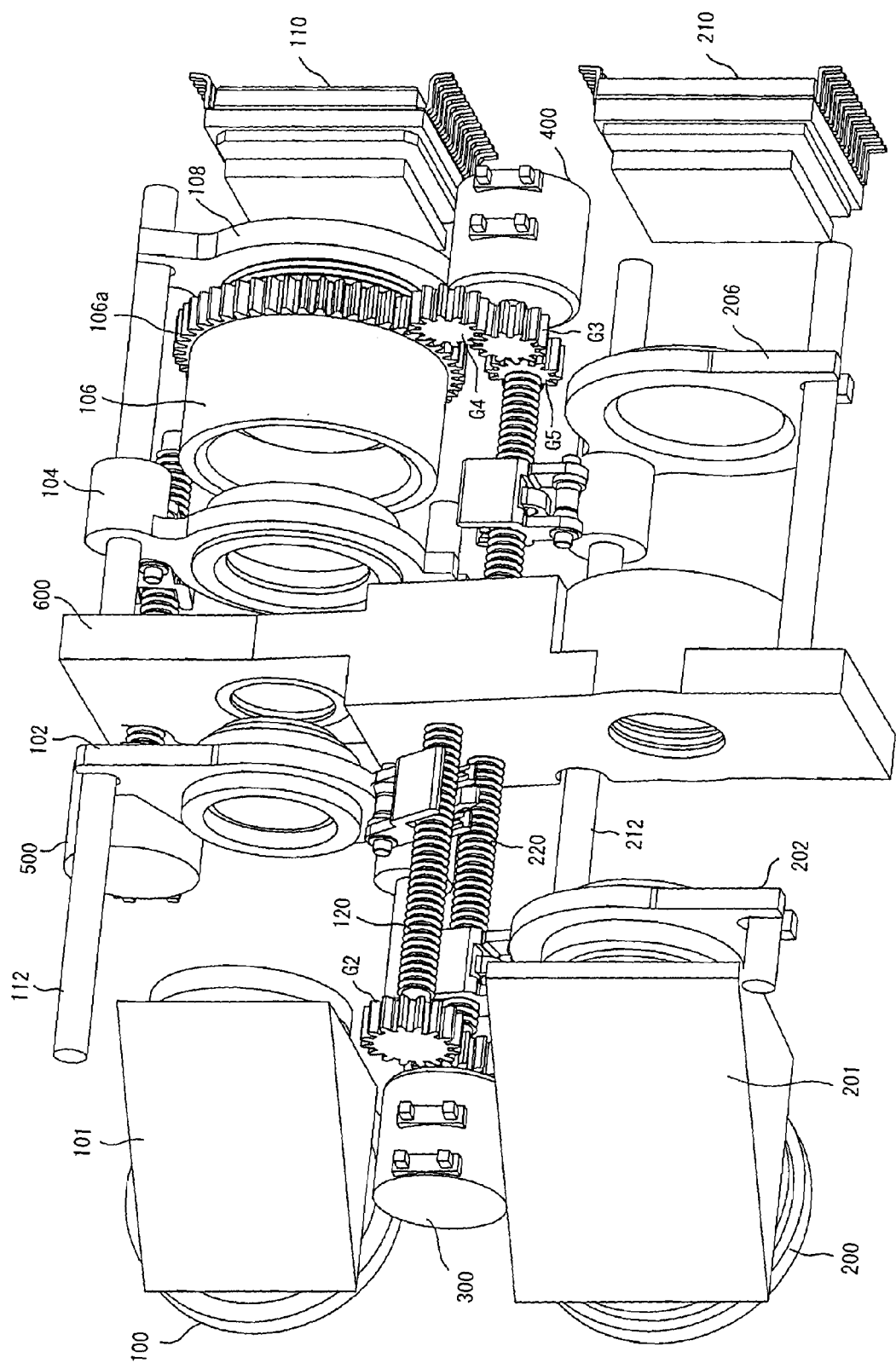
FIG. 2 is a (rear) view showing the internal structure of the digital camera of the present embodiment.

FIGS. 1 and 2 show the internal structure of a digital camera of the present embodiment. FIG. 1 shows the structure when viewed from the front, and FIG. 2 shows the structure when viewed from the back.

The first imaging optical system has a zoom lens having a 35 mm film equivalent focal length range from 39 mm to 117 mm. The user sets a zoom position by means of actuating a zoom button. When a desired zoom position is achieved, the user actuates a shutter button to thus capture an image. Firing of strobe light is controlled, as appropriate, in accordance with the brightness of a subject, and a captured image is displayed on an LCD. The zoom lens is formed from a so-called dioptric system. Light of a subject (hereinafter called "subject light") having entered a first lens group 100 is refracted at right angles by a prism 101. The thus-refracted light forms an image of the subject on a first imaging element 110 by way of zoom lens groups 102 and 104 and a focus lens group 108. The zoom lens groups 102 and 104 and the focus lens group 108 are guided by a rod 112 and configured so as to be able to travel in the direction of an optical axis. As a result of movement of the lens groups, a synthetic focal length of the entire lens is changed. Although the first imaging optical system has the two zoom lens groups 102 and 104, the zoom lens group 102 is disposed forward of a shutter-and-aperture assembly 600 (i.e., at a position proximate to the subject), and the zoom lens group 104 is disposed rearward of the shutter-and-aperture assembly 600 (i.e., at a position proximate to an image sensor). The zoom lens group 104 is actuated by a drive motor 500 which is different from that for the zoom lens group 102.

The second imaging optical system has a zoom lens having a 35 mm film equivalent focal length range from 130 mm to 390 mm. This zoom lens is also formed from a so-called dioptric system. Subject light having entered a first lens group 200 is refracted at right angles by a prism 201, and the thus-refracted light forms an image of the subject on a second imaging element 210 by way of a zoom lens group 202 and a focus lens group 206.

The zoom lens 202 and the focus lens 206 are guided by a rod 212, and are configured so as to be able to travel in the direction of the optical axis. A synthetic focal length of the entire lens is changed by actuation of the lens groups.

In the present embodiment, zooming drive motors 300, 500 and a focusing drive motor 400 are provided as motors for actuating these lens groups. Drive motors shared between the first imaging optical system and the second imaging optical system are drive motors 300 and 400. A drive mechanism of these drive motors 300 and 400 will be described hereunder.

A feed screw 220 is coupled directly to the zoom drive motor 300, and a feed screw 120 is also coupled to the motor 300 by way of gears G1 and G2. The feed screws 120, 220 are therefore rotationally driven in opposite directions by means of the zooming drive motor 300. The feed screw 120 is screw-engaged with a nut, and the zoom lens group 102 of the first imaging optical system is connected to this nut. When the feed screw 120 is rotated, the zoom lens 102 is guided by the rod 112, to thus move in the direction of the optical axis. Meanwhile, the nut is screw-engaged with the feed screw 220, as well, and the zoom lens group 202 of the second imaging optical system is connected to this nut. When the feed screw 220 is rotated, the zoom lens 202 is guided by the rod 212, to thus travel in the direction of the optical axis. When the feed screw 120 and the feed screw 220 are rotationally driven in opposite directions by means of the zooming drive motor 300, the zoom lens group 102 and the zoom lens group 202 are moved in opposite directions accordingly. Specifically, when the zoom lens group 102 moves from the WIDE-end to the TELE-end, the zoom lens group 202 moves from the TELE-end to the WIDE-end. Meanwhile, when the zoom lens group 102 moves from the TELE-end to the WIDE-end, the zoom lens group 202 moves from the WIDE-end to the TELE-end.

In accordance with a command from an unillustrated control circuit, the zooming drive motor 300 rotates forward or backward in response to actuation of the zoom button provided on the digital camera. When the first imaging optical system changes from the WIDE-end (a 35 mm film equivalent focal length of 39 mm) to the TELE-end (a 35 mm film equivalent focal length of 117 mm) in a direction where the focal length is increased, by means of unidirectional rotation of the zooming drive motor 300, the second imaging optical system changes from the TELE-end (a 35 mm film equivalent focal length of 390 mm) to the WIDE-end (a 35 mm film equivalent focal length of 130 mm) in a direction where the focal length is decreased.

A gear G3 is coupled to a focusing motor 400, and a gear G4 and a gear G5 mesh with the gear G3. The gear G4 meshes with an outer peripheral gear 106a formed along the outer rim of a lens guide ring 106 assuming a hollow, cylindrical shape, and rotationally drives the lens guide ring 106. An inner periphery of the lens guide ring 106 is threaded, and the focus lens group 108 meshes, in a held manner, with the inner peripheral thread. When the lens guide ring 106 is rotated, the focus lens group 108 meshing with the inner peripheral thread is guided by the rod 112, to thus travel in the direction of the optical axis. Moreover, the gear G5 is coupled with a feed screw 230, and a nut meshes with the feed screw 230. The focus lens group 206 is connected to this nut. When the feed screw 230 is rotated, the focus lens group 206 is guided by the rod 212, to thus travel in the direction of the optical axis. Consequently, by means of rotation of the single focusing motor 400, the focus lens group 108 of the first imaging optical system and the focus lens group 206 of the second imaging optical system move in the direction of the optical axis. The focusing drive motor 400 rotates forward or backward in accordance with a command from the control circuit of the unillustrated digital camera, thereby performing auto-focusing operation. As a result, settings are made in such a way that the distance to the focused subject of the first imaging optical system coincides with the distance to the focused subject of the second imaging optical system. Specifically, settings are made in such a way that, when the first imaging optical system remains focused at infinity distance, the second imaging optical system also remains focused at infinite distance; and that, when the first imaging optical system remains focused at a subject distance of two meters, the second imaging optical system focuses at a subject distance of two meters.

The second imaging optical system is a TELE-end optical system having a relatively narrow angle of view, and the amount of movement of the focus lens group 206 is relatively great. Therefore, in the present embodiment, the focus lens group 206 is moved directly by means of the feed screw 230. The amount of movement of the focus lens group 206 can be adjusted by means of changing the ratio of the gear G3 to the gear G5 and the pitch of the feed screw 230. Meanwhile, since the first imaging optical system is a WIDE-end optical system having a relatively-wide angle of view, the amount of movement of the focus lens group 108 must be smaller, and a resolving power of the same must be increased. For this reason, a desired reduction ratio of the focus lens group 108 is achieved not by the feed screw but by a combination of the gear G3 with the outer peripheral gear 106a of the lens guide ring 106. In short, the resolving power of the focus lens group 108 is enhanced by means of a combination of the gear G3 having a smaller number of teeth with the outer peripheral gear 106a of the lens guide ring 106 having a larger number of teeth. Since the focus lens group 108 meshes with the inner peripheral thread of the lens guide ring 106, the resolving power can also be adjusted by means of adjusting the pitch of the inner peripheral thread. The resolving power of the focus lens group 108 can be coarsely adjusted by means of the reduction ratio of the gear G3 to the outer peripheral gear 106a. The resolving power of the focus lens group 108 can also be finely adjusted by means of the pitch of the inner peripheral thread of the lens guide ring 106.

When the power of the digital camera is activated, the control circuit sets the digital camera in an initial state. In this initial state, the first imaging optical system becomes operative, and the zoom position of the first imaging optical system is set to the WIDE-end (a 35 mm film equivalent focal length of 39 mm), and the zoom position of the second imaging optical system is set to the TELE-end (a 35 mm film equivalent focal length of 390 mm).

When the user has actuated the TELE-end of the zoom button in the initial state, the zooming drive motor 300 rotates to thus actuate the first imaging optical system in the direction where the focal length of the first imaging optical system increases (zooming-in), as well as to actuate the second imaging optical system in the direction where the focal length of the second imaging optical system decreases (zooming-out).

Since the first imaging optical system operates at the initial setting, an image appearing on the LCD corresponds to an image captured by the first imaging optical system. This image is converted into an image which is acquired as a result of the first imaging optical system zooming in from the WIDE-end (a 35 mm film equivalent focal length of 39 mm). When the TELE-end of the zoom button continues to be actuated, the first imaging optical system reaches the TELE-end (a 35 mm film equivalent focal length of 117 mm). When the zoom button continues to be actuated further, an image acquired by subjecting an image of the first imaging optical system to electronic zooming appears. When the second imaging optical system has reached the WIDE-end (a 35 mm film equivalent focal length of 130 mm) by means of setting operation, the imaging optical system is automatically switched. The second imaging optical system becomes operative, and an image thereof appears on the LCD. At this time, as mentioned above, the first imaging optical system and the second imaging optical system perform zooming operation in such a way that the focal lengths thereof change in opposite directions. Accordingly, at a point in time when the first imaging optical system has reached the TELE-end, the second imaging optical system has already reached the WIDE-end. The imaging optical system can be switched smoothly without involvement of an additional movement of the zoom lens group 202 of the second imaging optical system during switching.

When the zoom button further continues to be actuated to the TELE-end, the zooming drive motor 300 then reversely rotates, thereby moving the second imaging optical system in a direction in which the focal length thereof increases (zooming-in). When the zoom button is actuated to the WIDE-end, operation which is the reverse of operation performed during zooming-in is performed. Specifically, the zooming drive motor 300 rotates to thus move the first imaging optical system in a direction in which the focal length thereof increases (zooming-in) and to move the second imaging optical system in a direction where the focal length thereof decreases (zooming-out). When the zoom button continues to be actuated toward the WIDE-end, the second imaging optical system reaches the WIDE-end. When the zoom button continues to be actuated further, the imaging optical system is automatically switched, and the first imaging optical system becomes operative, and an image captured thereby is displayed on the LCD. The first imaging optical system and the second imaging optical system perform zooming such that the focal lengths thereof change in opposite directions. Accordingly, at a point in time when the second imaging optical system has reached the WIDE-end, the first imaging optical system has already reached the TELE-end, and switching can be smoothly performed without involvement of additional movement of the zoom lens group 102 of the first imaging optical system during switching.

When the shutter button is actuated at a point in time when a predetermined angle of view is set, autofocusing operation is performed by means of a known method. An image signal is read from an imaging element that is in operation, and the thus-read signal is subjected to processing. The focusing drive motor 400 is rotated in accordance with a result of processing, thereby adjusting the focuses of both imaging optical systems. As mentioned above, the settings have already been made in such a way that the systems coincide with each other in terms of focused subject distances. Accordingly, even when switching between the first and second imaging optical systems has been performed, there is no necessity of performing autofocusing operation again from the beginning, and processing can proceed directly to the next sequence. When the shutter button is further actuated in this state, an image signal from the imaging optical system that is in operation at that time is processed, and the thus-processed image is stored in a storage medium such as a memory card or the like.

As mentioned above, in the present embodiment, as a result of the first imaging optical system and the second imaging optical system sharing the focusing drive motor, an attempt can be made to curtail the number of drive motors. Moreover, when the focusing drive motor is shared, the combination of the gear G3 with the lens guide ring 106 is used for the first imaging optical system in consideration of the resolving powers of the two imaging optical systems. The combination of the feed screw 230 with the nut is used for the second imaging optical system. As a result, a single drive motor is enabled to perform driving operations.

PARTS LIST 100 first lens group
101 prism
102 zoom lens group
104 zoom lens group
106 lens guide ring
106a peripheral gear
108 focus lens group
110 first imaging element
112 rod
120 feed screw
200 first lens group
201 prism
202 zoom lens group
206 focus lens group
210 second imaging element
212 rod
220 feed screw
230 feed screw
300 zooming drive motor
400 focusing drive motor
500 zooming drive motor
600 shutter and aperture assembly
G1-G5 gears

What is claimed is:
1. An imaging apparatus having multiple optical systems, comprising:
a first imaging optical system; and
a second imaging optical system having an aperture of angle which differs from that of the first imaging optical system, wherein
the first imaging optical system has a first lens for focusing;

the second imaging optical system has a second lens for focusing;

the first lens and the second lens are driven by a common focusing drive motor;

the first lens meshes with an inner peripheral thread formed on a lens ring guide rotationally driven by the focusing drive motor; and the second lens is connected to a feed screw coupled to the focusing drive motor.

2. The imaging apparatus having multiple optical systems according to claim 1, wherein a gear is formed on an outer periphery of the lens guide ring, and meshes with the focusing drive motor.

3. The imaging apparatus having multiple optical systems according to claim 2, wherein an angle of view of the second imaging optical system is set so as to become smaller than an angle of view of the first imaging optical system; and a distance over which the first lens travels is set so as to become smaller than a distance over which the second lens travels.

* * * * *